June 1, 1948.    J. H. HASSLER ET AL    2,442,492
MACHINE FOR PRODUCING PREDETERMINED AND
UNIFORM DIMENSIONED WOOD SHAVINGS
Filed July 31, 1944    5 Sheets-Sheet 1
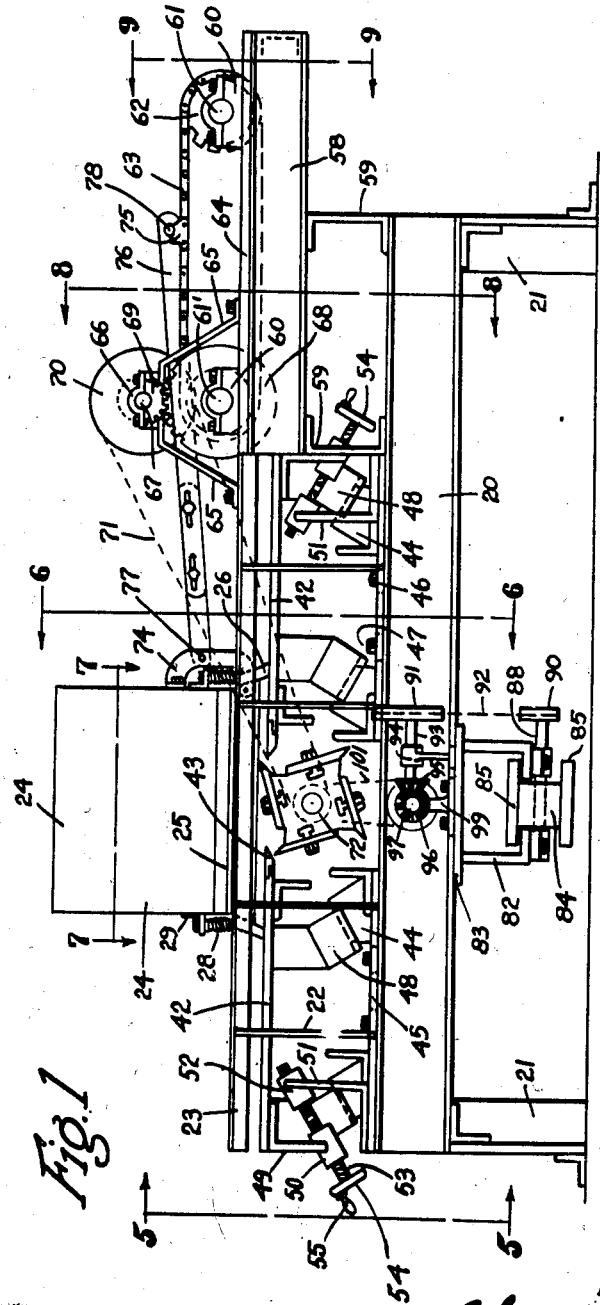
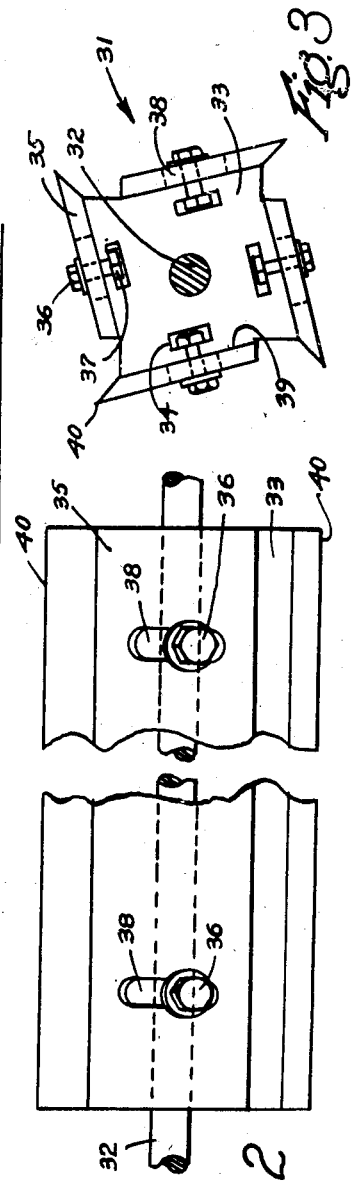
INVENTORS
JOHN H. HASSLER
LEONARD C. ENGLERT
BY
Christian R. Nielsen
ATTORNEY.

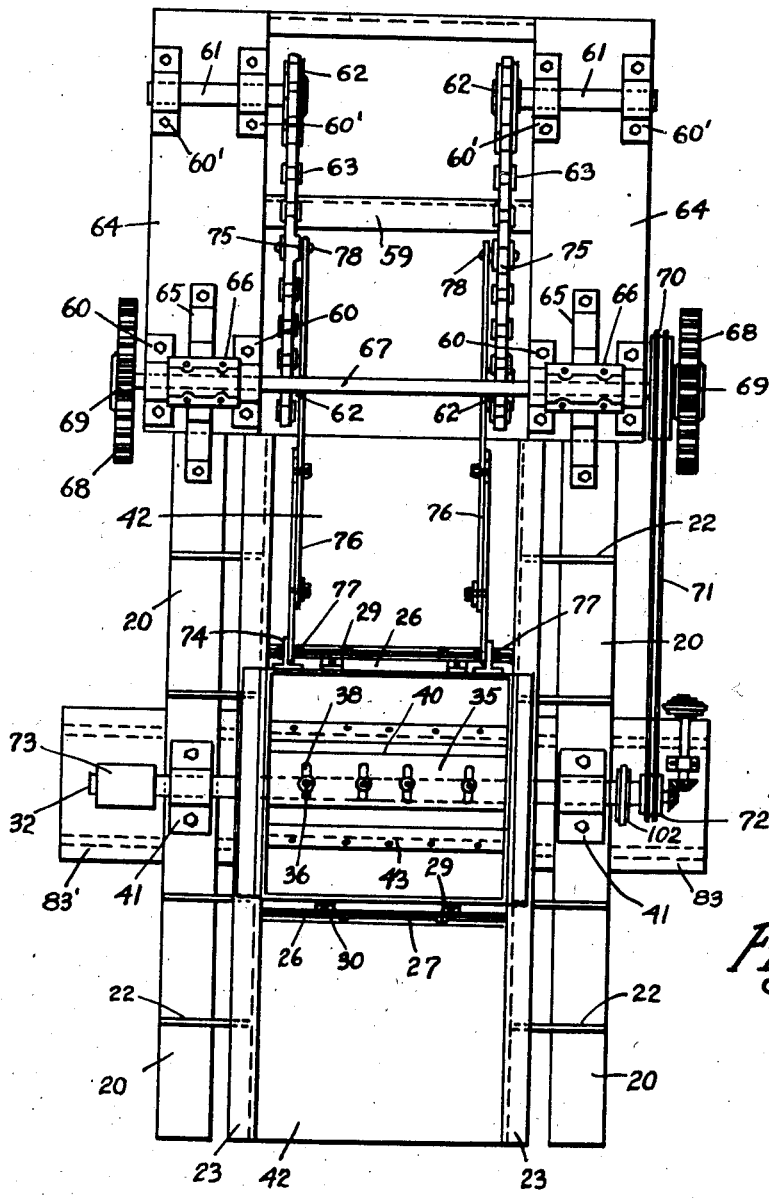

June 1, 1948.  J. H. HASSLER ET AL  2,442,492
MACHINE FOR PRODUCING PREDETERMINED AND
UNIFORM DIMENSIONED WOOD SHAVINGS
Filed July 31, 1944                                    5 Sheets-Sheet 3
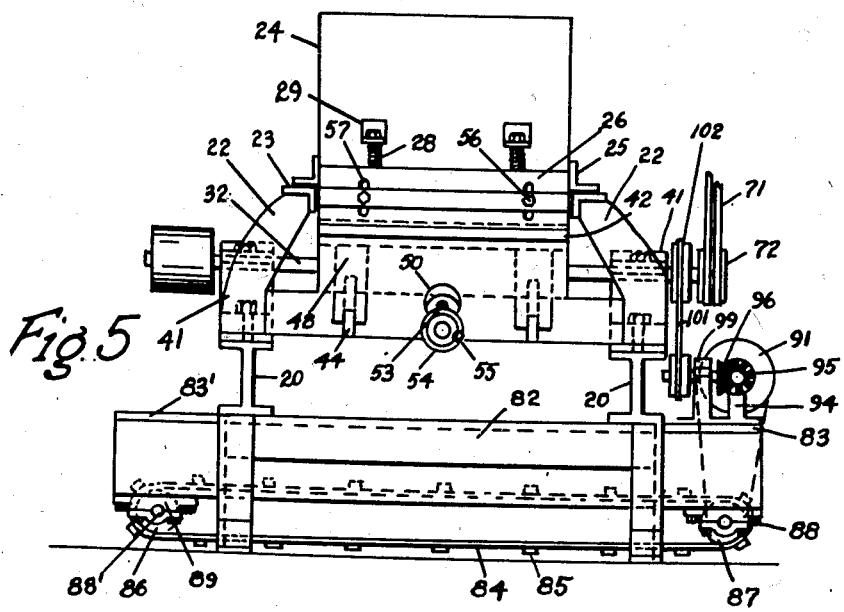
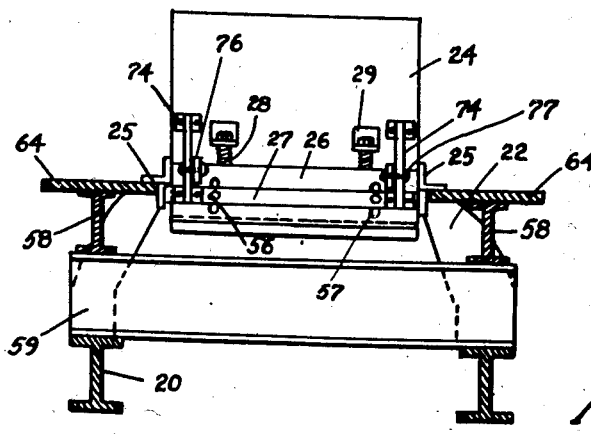
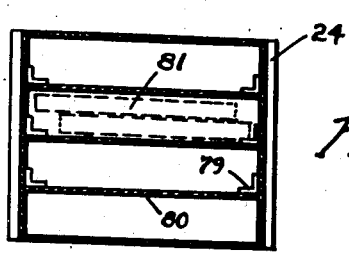
INVENTORS
JOHN H. HASSLER
LEONARD C. ENGLERT
BY
Christian R. Nielsen
ATTORNEY.

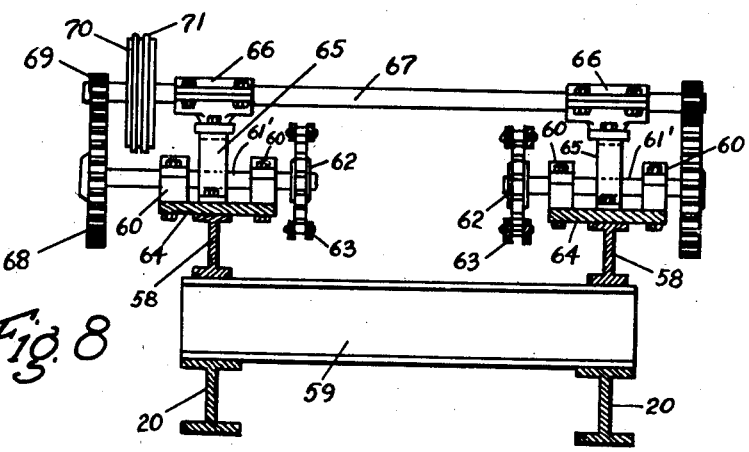
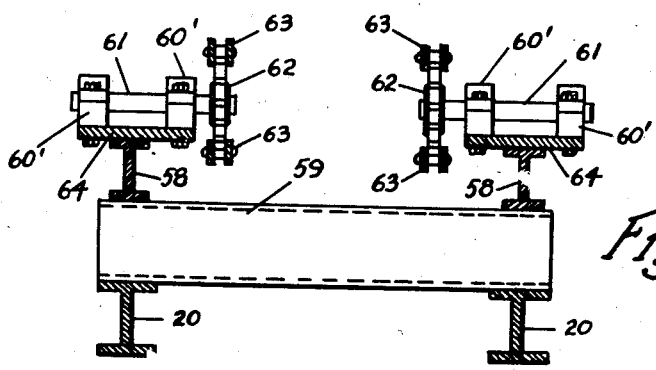
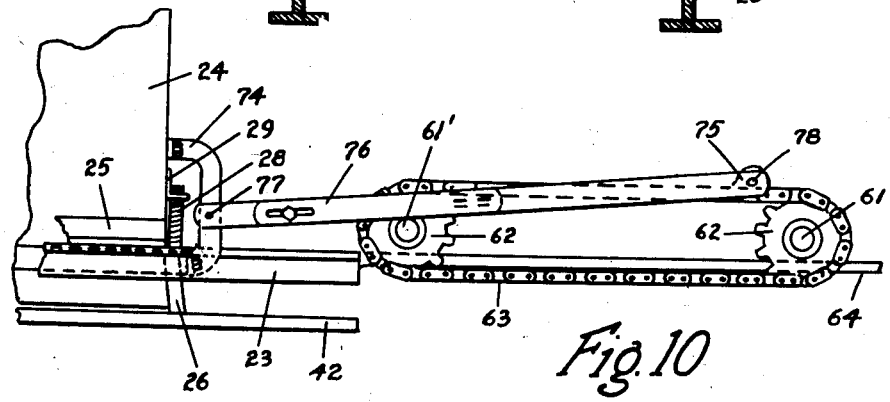

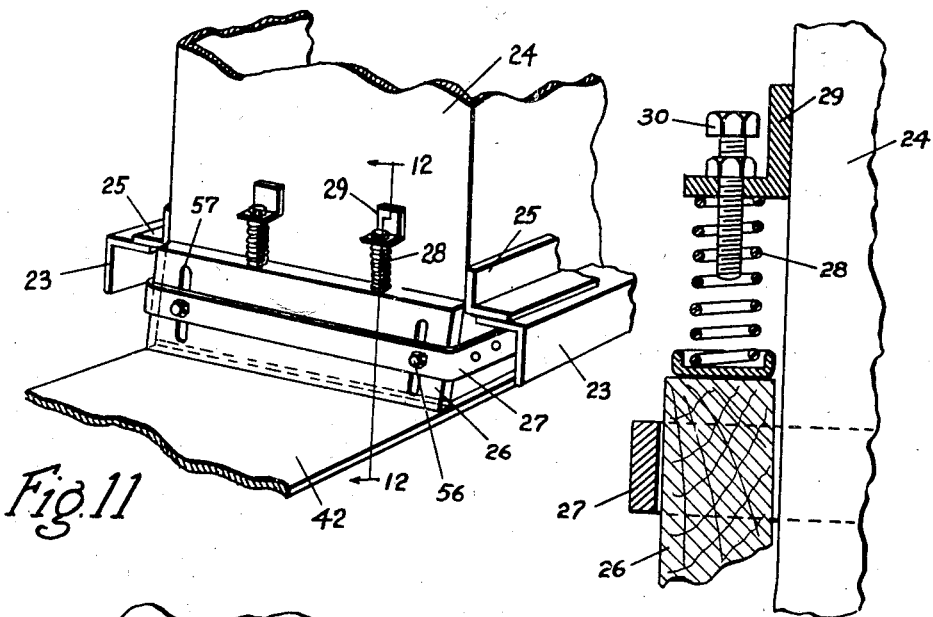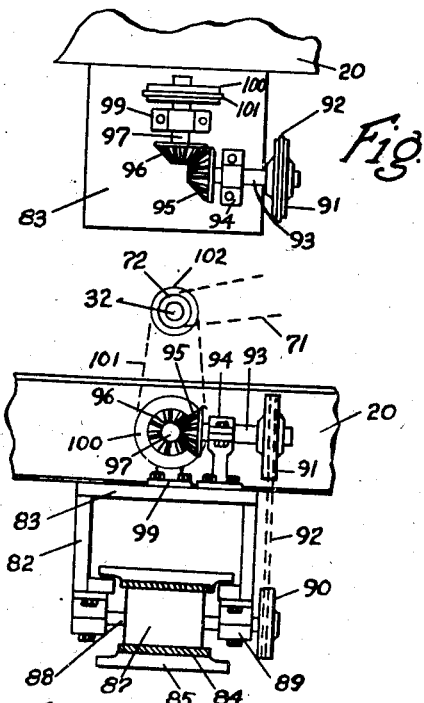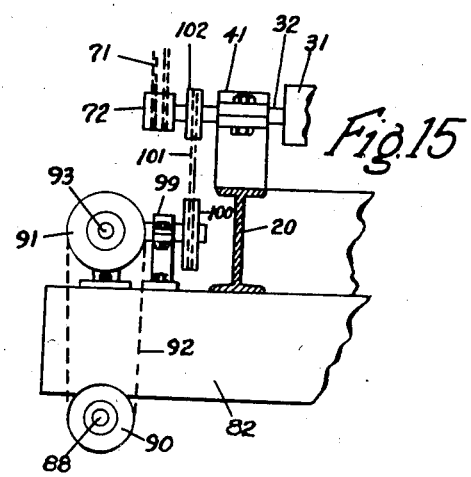

Patented June 1, 1948

2,442,492

UNITED STATES PATENT OFFICE 2,442,492

MACHINE FOR PRODUCING PREDETERMINED AND UNIFORM DIMENSIONED WOOD SHAVINGS

John H. Hassler and Leonard C. Englert, Wausau, Wis., assignors, by direct and mesne assignments, of one-half to said Hassler and one-half to Albert W. Gerhard Application July 31, 1944, Serial No. 547,342

2 Claims. (Cl. 241—301)

1

Our invention relates to a machine for producing wood shavings, and has for its object, the production of a machine that will permit shavings to be cut from wood, that is placed into an actuated hopper, the thickness and width of the shavings produced to be governed by adjustments made possible on the machine.

It is manifest to anyone familar with the art that the conventional machine for producing shavings, by means of a plurality of blades rotatably mounted, has a tendency to shave the wood into small particles of unequal thickness and size. However, there are definite uses to which shavings are put in which uniformity of the thickness, width and length of the shavings are desirable. The construction of our machine will permit controlling the size of the product produced.

The many objects of our invention will become more apparent as the description of the device proceeds, especially when taken in conjunction with the various figures in the drawings, in which:

Figure 1 is a side view of the entire assembly, illustrating the manner in which the hopper is actuated slidably over the revolving blades.

Figure 2 is a fragmentary side view of the rotary cutting blade assembly mounted on a shaft.

Figure 3 is an end view of the cutting blade assembly shown in Figure 2.

Figure 4 is a top view of the entire assembly.

Figure 5 is an end view of the machine, taken at the line 5—5 in Figure 1.

Figure 6 is a fragmentary cross sectional view of the device, taken at the line 6—6 in Figure 1.

Figure 7 is a horizontal cross sectional view of a modified hopper, taken at the line 7—7 in Figure 1.

Figure 8 is a cross sectional view of Figure 1, taken at the line 8—8.

Figure 9 is an end view of the machine, taken at the line 9—9 in Figure 1.

Figure 10 is a fragmentary side view of the chain and sprockets, provided with a pair of adjustable pusher arms for actuating the hopper in a slidable manner.

Figure 11 is a fragmentary perspective view of the hopper, illustrating the manner in which the end plates are kept in frictional contact with the adjustable surface plates.

Figure 12 is a fragmentary cross sectional view of Figure 11, taken at line 12—12.

Figure 13 is a top view of the conveyer driving mechanism.

Figure 14 is an end view of the conveyer driving mechanism, showing the conveyer belt in cross section, and Figure 15 is a side view of Figure 14.

Similar characters of reference indicate corresponding parts throughout the several views, and referring now to the same, the character 20 shows a pair of I beams, acting as a base, supported by vertical structural members 21 acting as legs. A plurality of side brackets 22, disposed upward from the I beams 20, support a pair of slide rails 23, shown constructed of angle iron, and extending horizontally with the beams 20.

A rectangularly shaped hopper 24, supported by angle iron rests 25, slidably engages the upper surface of the slide rails 23. This hopper 24 is provided with slidably mounted end boards 26, guided by a strap member 27, and urged downward by a pair of resilient members 28, in the form of springs, supported by small angle iron members 29, and which are fastened to the hopper 24 and support the springs 28 by means of the bolt 30.

There is a rotary blade assembly 31, consisting of a shaft 32 and a block 33, said block having grooves 34 disposed longitudinally on the flat surface top as shown in Figure 3. There are blades 35 extending longitudinally the length of the block 33, and fastened by means of bolts 36, having the head 37 of the bolt engaging the slot 34, the bolt projecting outward through slots 38 in the blades 35, making it possible to adjust the blade 35 forward or backward onto the face 39 of the block 33. The blades 35, of which there are four shown in Figure 3, are ground to a cutting edge 40. It is understood, however, that there may be as many blades as desired, depending on the speed of the revolving unit and also the size of the shaving to be cut. These blades 35 may also be notched in staggered relation to one another if desired. The entire rotary blade assembly 31 is mounted on the shaft 32, which, in turn, is journalled in bearings 41 mounted to the upper face of the base beams 20.

Disposed at a point between the slide rails 23 above the base beams 20 are a pair of surface plates 42. These plates 42 are provided with removable edges 43 and beveled to conform with the cutting edges of the blades 35 on the blade assembly 31. The plates 42 are supported by angularly disposed blocks 44, mounted onto slidable plates 45, resting onto the upper surface of the beams 20, and provided with slots 46 through which bolts 47 are placed. The angularly disposed blocks 44, in turn, support grooved blocks 48 of the same angular relation as the blocks 44 and fastened to the bottom of the surface plates 42. In this manner, the plates 42 rest on and are supported by the beams 20 through contact with the grooved angularly disposed blocks 44 and 48.

There is an adjustment arrangement for raising and lowering the surface plates 42, consisting of angle irons 49 supporting a threaded block 50 and an angle iron 51 supporting a threaded block 52. The angle iron 49 is attached to the bottom of the plate 42, while the angle iron 51 rests on the slidable plate 45. The threaded block 50 is supported by the downwardly extending flange of the angle iron 49, while the threaded block 52 is supported by the upwardly extending flange of the angle iron 51. Both the blocks 50 and 52 are engaged by a rotatively mounted screw 53, which is shown rotated by means of a wheel 54 provided with a handle 55. In this manner, rotating the wheel 54 revolves the screw 53, which engages the threaded blocks 50 and 52 which are provided with right and left hand threads respectively. The screw 53, being similarly provided, will draw the blocks 50 and 52 toward one another or away from one another, thereby sliding the angularly disposed blocks 44 and 48, and raising the surface plates 42 or lowering the surface plates 42 and bringing the ends of the plates 42 closer toward or away from the rotating blade assembly 31. This will determine the depth of the cut and will govern the thickness of the shaving.

Obviously, the end boards 26 on the hopper 24 will, at all times, contact the upper surface of the plates 42, due to the downward tension of the spring 28, the board 26 being guided by the bolts 56 sliding within the slots 57 in the board 26. The sliding action of the end boards 26, onto the surface of the plates 42, will prevent the chips or wood from being forced outside of the hopper 24, and the angle of the hopper, at the point where the boards 26 are attached, will prevent the wood inside of the hopper from creeping upward at the ends of the hopper. This is a distinct advantage and assists very materially in permitting proper function of the device.

There are extending members 58 shown, supported by channel irons 59 on the upper face of the base beams 20. These members 58 act as a support for bearings 60 and 60' supporting shafts 61 and 61' on which are mounted sprockets 62. The chains 63 are shown disposed over the sprockets 62.

The bearings 60 and 60' are mounted on surface plates 64, which have their top surface shown in direct alignment with the top surface of the slide rails 23.

A pair of auxiliary supports 65 are mounted onto the plates 64, and project upward over the bearings 60 shown in Figure 8. These supports suspend a pair of bearings 66 into which a shaft 67 is journalled.

On the extreme outer ends of the shaft 61' are spur gears 68, and these spur gears 68 engage pinions 69 which are attached to the extreme outer ends of the shaft 67 journalled in the auxiliary bearings 66. There is also a pulley 70, shown mounted on the shaft 67, between the pinions 69 and the bearings 66. This pulley 70 is caused to revolve by means of a belt 71 engaging a drive pulley 72 on the end of the shaft 32 which supports the blade assembly 31. The shaft 32 has a drive pulley 73 attached to the other end of it, and this pulley 73 is thereby connected to and is revolved by an actuating force (not shown) which may be an electric motor, an internal combustion engine or any suitable means.

The hopper 24 has a pair of actuating brackets 74 attached to one of its sides. These brackets 74 are connected to special links 75 on the chain 63 by means of actuating link levers 76, which consist of separate sections overlapping one another and joined by means of bolts through slots, and the levers are hingedly supported at 77 and 78 respectively on the brackets 74 and the special link members 75 of the chain 63.

In Figure 7, we show a modified arrangement of the inside of the hopper 24, in which a plurality of angles 79 are disposed vertically on the inner surface of the hopper 24, and these angles 79 support a plurality of removable partitions 80. It is apparent that the number of angles 79 and partitions 80 employed would be determined by the size of the shavings to be made. By employing the partitions 80 within the hopper 24 to support wood particles shown as 81, the width of the shavings may be governed if, for example, the wood pieces 81 have been previously sawed to a width of two inches and deposited within the space between the partitions in a manner so that the grain of the wood is in a horizontal plane, all shavings cut by the blades 35 will be of a two inch width, or if two one inch pieces are deposited adjacent to one another by the partitions 80 spaced two inches apart, one inch wide shavings would be produced.

Immediately below the base beams 20, in direct alignment with the rotary blade assembly 31 and deposited parallel thereto, is an open trough 82 provided with cover plates 83 and 83' extended outward from the base beam 20 in both directions. The trough 82 is equipped with a conveyer belt 84 provided with a plurality of cleats 85. The belt 84 is actuated by means of pulleys 86 and 87 mounted on shafts 88 journalled in bearings 89 on the lower face of the trough 82. One of the shafts 88 is provided with a pulley 90 actuated by a driven pulley 91 by means of a belt 92. The pulley 91 is mounted on a shaft 93 journalled in a bearing 94, which bearing is mounted on top of the cover plate 83. The other end of the shaft 93 is provided with a mitre gear 95 engaging another mitre gear 96, mounted on the end of another shaft 97 which is disposed at right angles to the shaft 93. The shaft 97 is journalled in a bearing 99, which is also mounted on top of the cover plate 83. The shaft 97 has a pulley 100 mounted thereon and actuated by means of a belt 101 from a pulley 102, fastened to the shaft 32 at a point between the pulley 72 and the bearing 41.

In operation the device functions as follows:

A source of motive power (not shown) is attached by any suitable means to a pulley 73, or if a chain drive is employed, the pulley 73 may be replaced with a sprocket, and if the unit is to be gear driven, by a gear. The revolving of the pulley 73 turns the shaft 32 on which the blade assembly 31 is mounted. The wood slabs 81, or their equivalent, are placed in the hopper 24. As the shaft 32 revolves the pulley 72, the pulley 70 is revolved by means of the belt 71 contacting the pulleys 70 and 72. This, in turn, revolves the shaft 67 having pinions 69 on each end thereof engaging spur gears 68, thereby causing the sprockets 62 to be turned and actuated by the chain 63. The actuating link levers 76 are attached to the chain 63 at 78 and through the brackets 74 on the outside of the hopper 24. These link levers are moved by the chain 63, thereby causing the hopper 24 to slidably move over the surface plates 42 along the slide rails 23. The plates 42, being spaced from one another and extending away from the blade assembly 31, permit contact of the blades 35 with the wood in the hopper 24, which is fed downward to the blades 35 by gravity.

By turning the screws 53 and by contact of the blocks 44 and 48, the plates 42 are moved upward or downward and, at the same time, spread apart from one another or brought closer together toward and away from the revolving blades 35 on the blade assembly 31. In this manner, the thickness and length of the shavings being cut is controlled, and the distance between the cutting edges 40 of the various blades 35 together with the speed of travel of the hopper, as actuated by the chains 63, will determine the cutting efficiency of the blades, for obviously, there must be a different rate of synchronization when cutting hard wood or soft wood.

It is also obvious that the frictional contact of the bottom of the end boards 26 with the top surface of the surface plates 42 will prevent the wood from creeping below the hopper, and the degree of angle of the hopper and plates are set where the end boards 26 are attached will keep the wood in the hopper 24 from raising upward when the blades cut at the end of the stroke.

The conveyer belt 84, receiving the shavings through the open trough 82, will cause the shavings to be brought outward away from the machine, where they may be deposited into a car or the like by means of a blower or any other conventional manner.

The entire unit permits adjustment of the height of the surface plates in their relation with the revolving blades. The angularly disposed blocks 44 and 48 may be moved and adjusted by the plates 45, the bearings 60' are adjustable on the plates 64 for keeping the proper tension on the chain 63 and the travel of the hopper 24 may be regulated by the link levers 76.

Having thus described our invention what we claim and desire to secure by Letters Patent is:

1. A device of the character described comprising a horizontal base, legs vertically disposed for supporting said base, a pair of horizontal slide rails extending longitudinally with and supported by said base, a blade assembly consisting of a plurality of blades mounted on a shaft journalled in bearings supported by said base, said blade assembly disposed in angular relation to the slide rails, a hopper slidably mounted on said slide rails and extending downward between said rails, a pair of surface plates mounted in an adjustable manner to said base between said rails, said surface plates extending in opposite directions from said blade assembly, means for raising and lowering said surface plates on angularly disposed blocks supported by said base thereby causing said surface plates to approach said blade assembly when being raised, and retrieved from said blade assembly when being lowered in relation to the periphery of the revolving blades, adjustable end boards mounted on the outer face of said hopper in parallel relation to said blade assembly, said end boards urged downward for frictional contact with the face of said surface plates, two pair of sprockets mounted on shafts journalled in bearings supported by said base, each pair of sprockets connected by an endless chain, a pair of actuating links hingedly supported by said chain on one end and said hopper on the other end, said links constructed of two members adjacent to one another and provided with elongated slots at their point of contact to permit longitudinal adjustment, means for rotating said sprockets from the blade assembly, thereby causing slidable actuation of said hopper on said surface plate, a conveyer belt mounted below said blade assembly in parallel relation to said blade assembly, said conveyer belt actuated by means from said rotating blade assembly, thereby causing the particles cut by the blades to be carried outward and away from the machine.

2. A device as described in claim 1, in which the ends of said hopper supporting the end boards providing frictional contact with the surface plates are angularly disposed and extending outward at their lower end to prevent the material in said hopper from being forced upward when the blades contact the material at the end of the forward and backward stroke.

JOHN H. HASSLER.
LEONARD C. ENGLERT.

REFERENCES CITED

The following references are of record in the file of this patent:

UNITED STATES PATENTS

| Number | Name | Date |
|---|---|---|
| 31,779 | Burdett | Mar. 26, 1861 |
| 87,139 | Burghardt | Feb. 23, 1869 |
| 435,359 | Jull | Aug. 26, 1890 |
| 937,240 | Haldeman | Oct. 19, 1909 |
| 1,478,193 | Ward | Dec. 18, 1923 |
| 1,515,377 | White | Nov. 11, 1924 |
| 1,974,647 | Hagmaier | Sept. 25, 1934 |
| 1,999,607 | Hagmaier | Apr. 30, 1935 |